United States Patent
Akkarakaran et al.

(10) Patent No.: US 11,044,058 B2
(45) Date of Patent: Jun. 22, 2021

(54) METHODS AND APPARATUSES FOR MEDIA ACCESS CONTROL (MAC)—CONTROL ELEMENT (CE) ACTIVATION TIMING

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 11 days.

(21) Appl. No.: 16/396,568

(22) Filed: Apr. 26, 2019

(65) Prior Publication Data

US 2019/0334669 A1   Oct. 31, 2019

Related U.S. Application Data

(60) Provisional application No. 62/664,779, filed on Apr. 30, 2018.

(51) Int. Cl.
*H04L 5/00* (2006.01)
*H04W 76/28* (2018.01)
(Continued)

(52) U.S. Cl.
CPC .............. *H04L 5/0044* (2013.01); *H04L 1/16* (2013.01); *H04W 76/28* (2018.02); *H04W 92/10* (2013.01)

(58) Field of Classification Search
CPC ........ H04L 5/0044; H04L 1/16; H04W 76/28; H04W 92/10
See application file for complete search history.

(56) References Cited

U.S. PATENT DOCUMENTS 10,778,379 B2 *  9/2020 Lee .................. H04W 80/02
2011/0269490 A1 * 11/2011 Earnshaw ........... H04L 1/0026
                                                     455/509
(Continued)

OTHER PUBLICATIONS

Ericsson: "Feature Lead Summary 2 on Beam Measurement and Reporting," 3GPP Draft; R1-1805574 Feature Lead Summary 2 on Beam Management V2, 3rd Generation Partnership Project (3GPP), Mobile Competence Centre; 650,Route Des Lucioles ; F-06921 Sophia-Antipolis Cedex; France, vol. RAN WG1, No. Sanya, China; Apr. 16, 2018-Apr. 20, 2018, Apr. 19, 2018, XP051427757, Retrieved from the Internet: URL: http://www.3gpp.org/ftp/Meetings%5F3GPP%5FSYNC/RAN1/Docs/ [retrieved on Apr. 19, 2018] pp. 4, 24-25.
(Continued)

*Primary Examiner* — Michael J Moore, Jr.
(74) *Attorney, Agent, or Firm* — Qualcomm Incorporated

(57) ABSTRACT

Procedures for activation timing for a media access control (MAC)-control element (CE) are disclosed. A first network entity may receive a MAC-CE activation message transmission from a second network entity, and may transmit an acknowledgement (ACK) message to the second network entity in response to receiving the MAC-CE activation message. The first network entity may determine a time to activate the MAC-CE based on the transmitted ACK message, and/or based on a detected interruption associated with the MAC-CE activation message. In aspects, the MAC-CE activation message transmission mat be received in at least one code block group (CBG). Various aspects provide for different rules for identifying interruptions associated with the MAC-CE activation message, and for determining the time to activate the MAC-CE based on the interruptions.

16 Claims, 8 Drawing Sheets

(51) Int. Cl.
*H04L 1/16* (2006.01)
*H04W 92/10* (2009.01)

(56) References Cited

U.S. PATENT DOCUMENTS

| | | | | |
|---|---|---|---|---|
| 2013/0176952 | A1* | 7/2013 | Shin | H04W 72/042 370/329 |
| 2013/0343261 | A1* | 12/2013 | Gonsa | H04L 5/001 370/315 |
| 2017/0222871 | A1* | 8/2017 | Yu | H04L 47/365 |
| 2018/0103395 | A1* | 4/2018 | Gholmieh | H04L 1/004 |
| 2019/0021088 | A1* | 1/2019 | Zhang | H04W 72/0453 |
| 2019/0124558 | A1* | 4/2019 | Ang | H04W 72/042 |
| 2019/0230667 | A1* | 7/2019 | Loehr | H04W 72/0466 |
| 2019/0335441 | A1* | 10/2019 | Bai | H04L 5/0053 |
| 2019/0357078 | A1* | 11/2019 | Akkarakaran | H04L 1/0079 |
| 2020/0154467 | A1* | 5/2020 | Gong | H04W 24/08 |
| 2020/0162207 | A1* | 5/2020 | Hwang | H04L 1/18 |
| 2020/0296657 | A1* | 9/2020 | Dinan | H04L 5/0057 |

OTHER PUBLICATIONS

Ericsson: "Interruption for 3DL CA Under SCell Activation/deactivation", 3GPP Draft; R4-152985 3DL CA Interruption Under Activation_Deactivation, 3rd Generation Partnership Project (3GPP), Mobile Competence Centre; 650, Route Des Lucioles; F-06921 Sophia-Antipolis Cedex, vol. RAN WG4, No. Fukuoka, Japan; May 25, 2015-May 29, 2015, May 24, 2015, XP050975873, 4 Pages, Retrieved from the Internet: URL: http://www.3gpp.org/ftp/Meetings_3GPP_SYNC/RAN4/Docs/ [retrieved on May 24, 2015] pp. 1, 2.
Huawei et al: "Discussion on RAN2 LS on Clarifications in MAC", 3GPP Draft; R4-1802689 Discussion on RAN2 LS on Clarifications in MAC, 3rd Generation Partnership Project (3GPP), Mobile Competence Centre; 650, Route Des Lucioles; F-06921 Sophia-Antipolis Cedex; vol. RAN WG4, No. Athens, Greece; Feb. 26, 2018-Mar. 2, 2018, Feb. 19, 2018, XP051402834, 2 pages, Retrieved from the Internet: URL: http://www.3gpp.org/ftp/tsg%Fran/WG4%5FRadio/TSGR4%5F86/Docs/ [retrieved on Feb. 19, 2018] the whole document.
International Search Report and Written Opinion—PCT/US2019/029697—ISA/EPO—dated Nov. 14, 2019.
Partial International Search Report—PCT/US2019/029697—ISA/EPO—dated Jul. 29, 2019.
Qualcomm Incorporated: "CA and BWP," 3GPP Draft; R1-1716440_CA_BWP, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339895, 7 pages, Retrieved from the Internet: URL: http://www.3gpp.org/ftp/Meetings_3GPP_SYNC/RAN1/Docs/ [retrieved on Sep. 17, 2017].
Qualcomm Incorporated; "Discussion on New MAC CE for MIMO," 3GPP Draft; R2-1803118, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2016-Mar. 2, 2018, Feb. 16, 2018, XP051400402, Retrieved from the Internet: URL: http://www.3gpp.org/ftp/tsg%5Fran/WG2%5FRL2/TSGR2%5F101/Docs/ [retrieved on Feb. 16, 2018] p. 3.
RENESAS Mobile Europe LTD: "Retuing Interruptions for CA Activation/ deactivation and Configuration/ deconfiguration", 3GPP Draft; R4-121354, 3rd Generation Partnership Project (3GPP), Mobile Competence Centre; 650, Route Des Lucioles; F-06921 Sophia-Antipolis Cedex; France, vol. RAN WG4, No. Jeju, Korea; Mar. 26, 2012-Mar. 30, 2012, Mar. 19, 2012, XP050612829, 5 pages, [retrieved on Mar. 19, 2012] pp. 2-4.

* cited by examiner

METHODS AND APPARATUSES FOR MEDIA ACCESS CONTROL (MAC)—CONTROL ELEMENT (CE) ACTIVATION TIMING

CROSS-REFERENCE TO RELATED APPLICATIONS

This application claims priority to U.S. Provisional Application No. 62/664,779, entitled "METHODS AND APPARATUSES FOR MEDIA ACCESS CONTROL (MAC)-CONTROL ELEMENT (CE) ACTIVATION TIMING," filed Apr. 30, 2018, the disclosure of which is hereby incorporated herein by reference.

BACKGROUND

Field

Aspects of the present disclosure relate generally to wireless communication systems, and more particularly, to methods and apparatuses for media access control (MAC)-control element (CE) activation timing.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving, at a first network entity, in at least one code block group (CBG), a MAC-CE activation message transmitted from a second network entity, transmitting, by the first network entity, an acknowledgement (ACK) message to the second network entity in response to receiving the MAC-CE activation message, and determining, by the first network entity, a time to activate the MAC-CE based on the transmitted ACK message.

In another aspect of the disclosure, a method of wireless communication includes receiving, at a first network entity, a MAC-CE activation message transmitted from a second network entity, transmitting, by the first network entity, an acknowledgement (ACK) message to the second network entity in response to receiving the MAC-CE activation message, detecting, by the first network entity, an interruption associated with the MAC-CE activation message, and determining, by the first network entity, a time to activate the MAC-CE based on the detected interruption.

In an additional aspect of the disclosure, an apparatus configured for wireless communication includes means for receiving, at a first network entity, a medium access control MAC-CE activation message transmitted from a second network entity, means for transmitting, by the first network entity, an ACK message to the second network entity in response to receiving the MAC-CE activation message, means for detecting, by the first network entity, an interruption associated with the MAC-CE activation message, and means for determining, by the first network entity, a time to activate the MAC-CE based on the detected interruption.

In an additional aspect of the disclosure, a non-transitory computer-readable medium having program code recorded thereon. The program code includes program code executable by a computer for causing the computer to receive, at a first network entity, a medium access control MAC-CE activation message transmitted from a second network entity, transmit, by the first network entity, an ACK message to the second network entity in response to receiving the MAC-CE activation message, detect, by the first network entity, an interruption associated with the MAC-CE activation message, and determine, by the first network entity, a time to activate the MAC-CE based on the detected interruption.

In an additional aspect of the disclosure, an apparatus configured for wireless communication is disclosed. The apparatus includes at least one processor, and a memory coupled to the processor. The processor is configured to receive, at a first network entity, in at least one code block group (CBG), a medium access control MAC-CE activation message transmitted from a second network entity, transmit, by the first network entity, an ACK message to the second network entity in response to receiving the MAC-CE activation message, and determine, by the first network entity, a time to activate the MAC-CE based on the transmitted ACK message.

In an additional aspect of the disclosure, an apparatus configured for wireless communication is disclosed. The apparatus includes at least one processor, and a memory coupled to the processor. The processor is configured to receive, at a first network entity, a medium access control MAC-CE activation message transmitted from a second network entity, transmit, by the first network entity, an ACK message to the second network entity in response to receiving the MAC-CE activation message, detect, by the first network entity, an interruption associated with the MAC-CE activation message, and determine, by the first network entity, a time to activate the MAC-CE based on the detected interruption.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
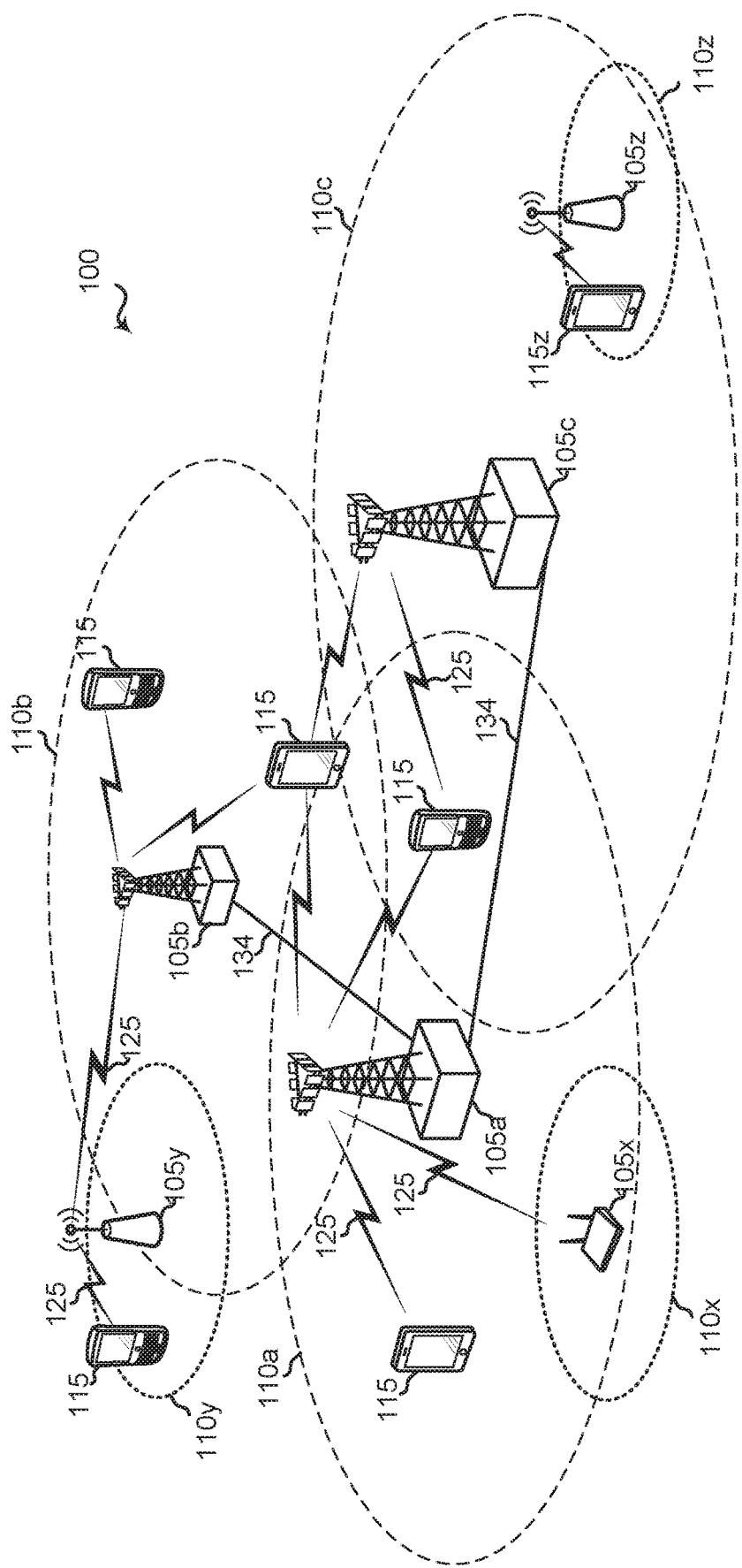
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
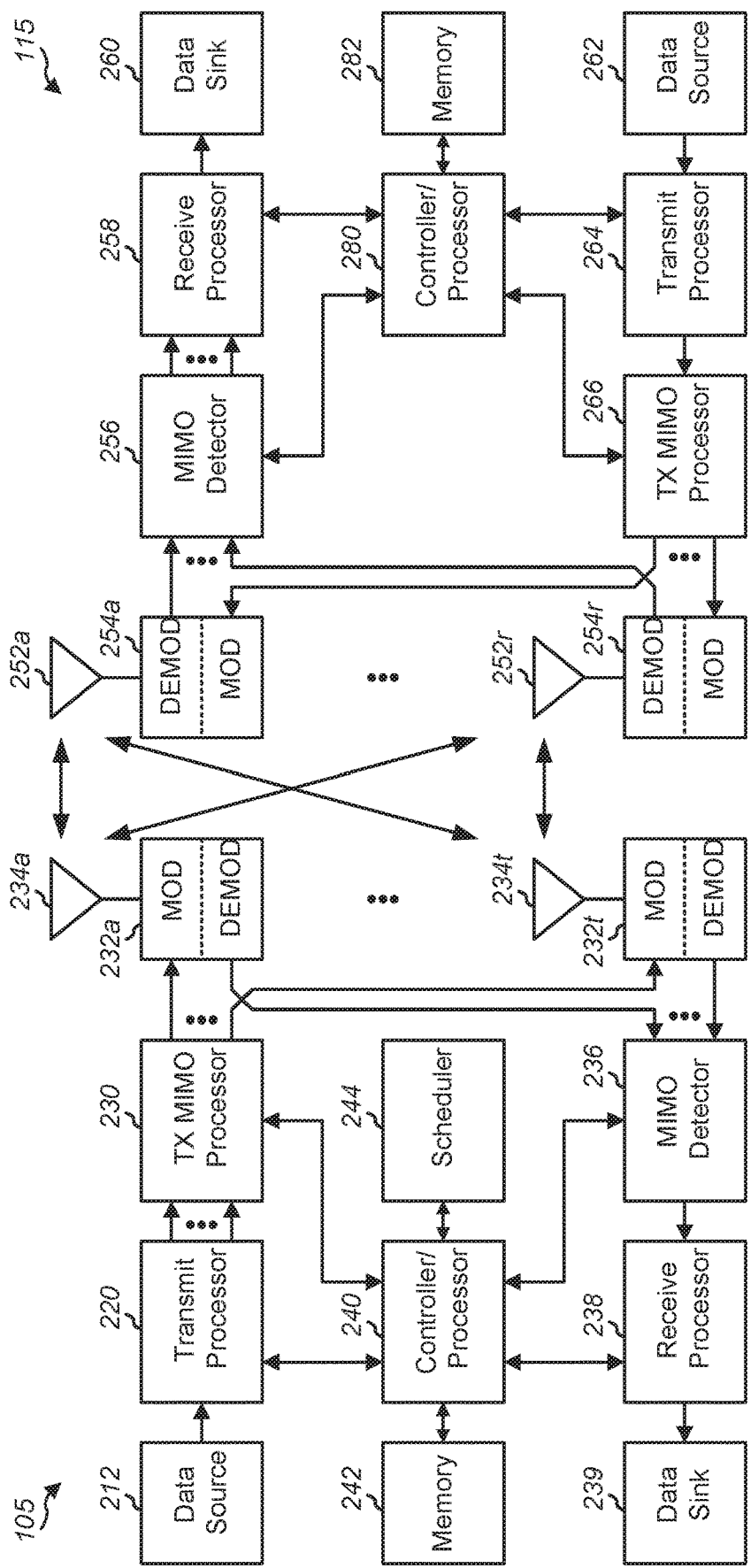
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the Physical Downlink Shared Channel (PDSCH), etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the Physical Uplink Shared Channel (PUSCH)) from a data source 262 and control information (e.g., for the Physical Uplink Control Channel (PUCCH)) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 8, and/or other processes for the techniques described herein. The memories 242 and 282 may store data and program codes for the eNB 105 and the UE 115, respectively. A scheduler 244 may schedule UEs for data transmission on the downlink and/or uplink.

A base station may transmit messages to a UE to configure the UE to operate in accordance with certain configurations. These messages may include a media access control (MAC)-control element (CE) command that may be sent to the UE in downlink signals, such as PDSCH and the like. The UE may receive the signal carrying the MAC-CE command and may subsequently activate the MAC-CE command. The UE may also transmit an acknowledgement (ACK) message to the base station acknowledging successful reception of the downlink signal. The ACK message may be transmitted to the base station in either the PUCCH or the PUSCH.

In order to synchronize the activation of the MAC-CE between the UE and the base station, one current approach calls for activating the MAC-CE after a latency period of N slots after transmission of the ACK by the UE. In some implementations, such as when 60 kHz subcarrier spacing (SCS) is used, N may be 12 slots, and when 120 kHz SCS is used, N may be 24 slots. In these cases, the MAC-CE may be activated after the latency period. In such current approach, the latency period may be calculated from the ending symbol of UE's transmission of the ACK for the downlink signal carrying the MAC-CE command to when the MAC-CE is applied by the UE.

However, under the current approach, there is an ambiguity as to what constitutes the ending symbol of the ACK transmission. For example, in some instances, acknowledgements for enhanced mobile broadband (eMBB) traffic may be interrupted by ultra-reliable low latency communication (URLLC) traffic. In these cases, the UE may interrupt the transmission of the ACK, and in some instances drop it completely, in order to facilitate the transmission of the higher priority traffic. In such cases, the ACK transmission may not be completed and the approach does not specify whether the ending symbol, for purposes of MAC-CE activation latency, may be the last symbol of the interrupted ACK actually transmitted, or whether the ending symbol may be the symbol that would have carried the ending ACK symbol but for the interruption.

In another example, the ACK may be multiplexed with other uplink control information (UCI). For example, the ACK and the other UCI may be multiplexed on a transmission over the PUCCH or PUSCH, such that some symbols in the transmission are modulated with the ACK and some symbols are modulated with the other UCI. In this example, the current approach fails to provide a mechanism for determining whether the ending symbol of the ACK transmission refers to the ending symbol of the entire multiplexed transmission, or whether it refers to the last symbol modulated with the ACK within the multiplexed transmission.

In yet another example, the MAC-CE message may be received by the UE in at least one code block group (CBG) of a set of CBGs. A transport block may be segmented into code blocks, and the code blocks may be grouped into the set of CBGs. The MAC-CE command may be transmitted in at least one of the CBGs in the set. The UE may receive the set of CBGs and may be able to reconstruct the MAC-CE message from the CBGs. Additionally, the UE may acknowledge receiving the CBGs to the base station. In some instances, the acknowledgement may include an ACK sent to the base station for each CBG individually. However, the current approach fails to provide a mechanism for determining whether the ending symbol of the ACK transmission, for purposes of MAC-CE activation latency, refers to the ending symbol of the ACK for the last CBG acknowledged, or whether the ending symbol refers to the ACK for the last CBG acknowledged that carries MAC-CE symbols. That is, it is unclear whether the ACK is deemed sent when all CBGs in the set of CBGs are ACK'ed, regardless of which CBGs carry MAC-CE information, or whether the ACK is deemed sent when all CBGs carrying MAC-CE information in the set of CBGs are ACK'ed.

In still another example, a UE may successfully transmit the ACK message without interruption. However, the base station may retransmit the downlink signal carrying the MAC-CE command, indicating that the UE's ACK was not decoded successfully by the base station. The UE may transmit a second ACK acknowledging a successful reception of the downlink signal retransmission. However, the current approach may fail to effectively handle this situation, as the current implementations do not provide for activating the MAC-CE command based on the second ACK.

Thus, it will be appreciated that systems implemented in accordance with the current approach may be deficient and lack functionality to handle the above described situations. Aspects of the present disclosure provide several solutions to the above problems through implementation of a particular manner of determining when to activate a MAC-CE command. The aspects disclosed herein allow a system to function more efficiently by providing functionality to address the problem existing in the current systems.

Various aspects are disclosed herein that describe several solutions to address the above discussed problem with respect to determining when to activate a MAC-CE command received by a UE. As noted above, the MAC-CE command may be activated by the UE after latency period that begins from the ending symbol of ACK transmission. However, there remains the ambiguity of determining the ending symbol in several situations in which a condition associated with the ACK transmission is detected, as discussed above (e.g., the ACK transmission is preempted by higher priority traffic, the ACK is multiplexed with UCI, in CBG-based ACK, and/or when a base station fails to decode the ACK). In aspects, the following solutions are disclosed.

It should be noted that although the description herein focuses on the timing for activation of a MAC-CE command transmitted by a base station and received by a UE on a downlink transmission (e.g., PDSCH) and acknowledged by the UE on an uplink transmission (e.g., PUCCH or PUSCH), the concepts described herein are not limited to this particular implementation, and readily apply to the timing for activation of a MAC-CE command transmitted by a UE on an uplink transmission (e.g., PUCCH or PUSCH) and acknowledged by a base station on a downlink transmission. The acknowledgment by the base station may be via a dedicated acknowledgment channel, similar to P-HICH in LTE, or may be via DCI in PDCCH, e.g., using the new data indicator (NDI) bit. In some cases, MAC-CE commands transmitted by the UE may not have a well-defined activation time. For example, the MAC-CE commands may simply indicate to the base station some condition at the UE, such as a power headroom report, and the base station may use the indication to perform an action. The action perform may be determined by the base station implementation. However, some MAC-CE commands transmitted by the UE may have an activation time based on the ending symbol of the acknowledgment associated with the MAC-CE transmission, and thus, the concepts described herein may apply to such MAC-CE commands.

Furthermore, the discussion herein may be focused on MAC-CE commands whose timing for activation may be based on the timing of the acknowledgement message associated with the MAC-CE transmission. However, those of skill in the art will appreciate that the concepts described herein may also extend to MAC-CE commands whose timing for activation may be based on the timing of the transmission or reception of the MAC-CE transmission. For example, in some cases, a portion of a reception of a signal carrying a MAC-CE command, such as the ending portion of a PDSCH or a PUSCH/PUCCH transmission, may be interrupted. In other cases, it may be a portion of a transmission of a signal carrying a MAC-CE command, such as the ending portion of a PUSCH/PUCCH or a PDSCH transmission that may be interrupted. In each of these cases, the interruption of the transmission or reception may result in an ambiguity as to when MAC-CE transmission may be considered complete for the purpose of determining the time to activate the MAC-CE command. This ambiguity may be resolved using the same concepts described herein.

Figure 3:
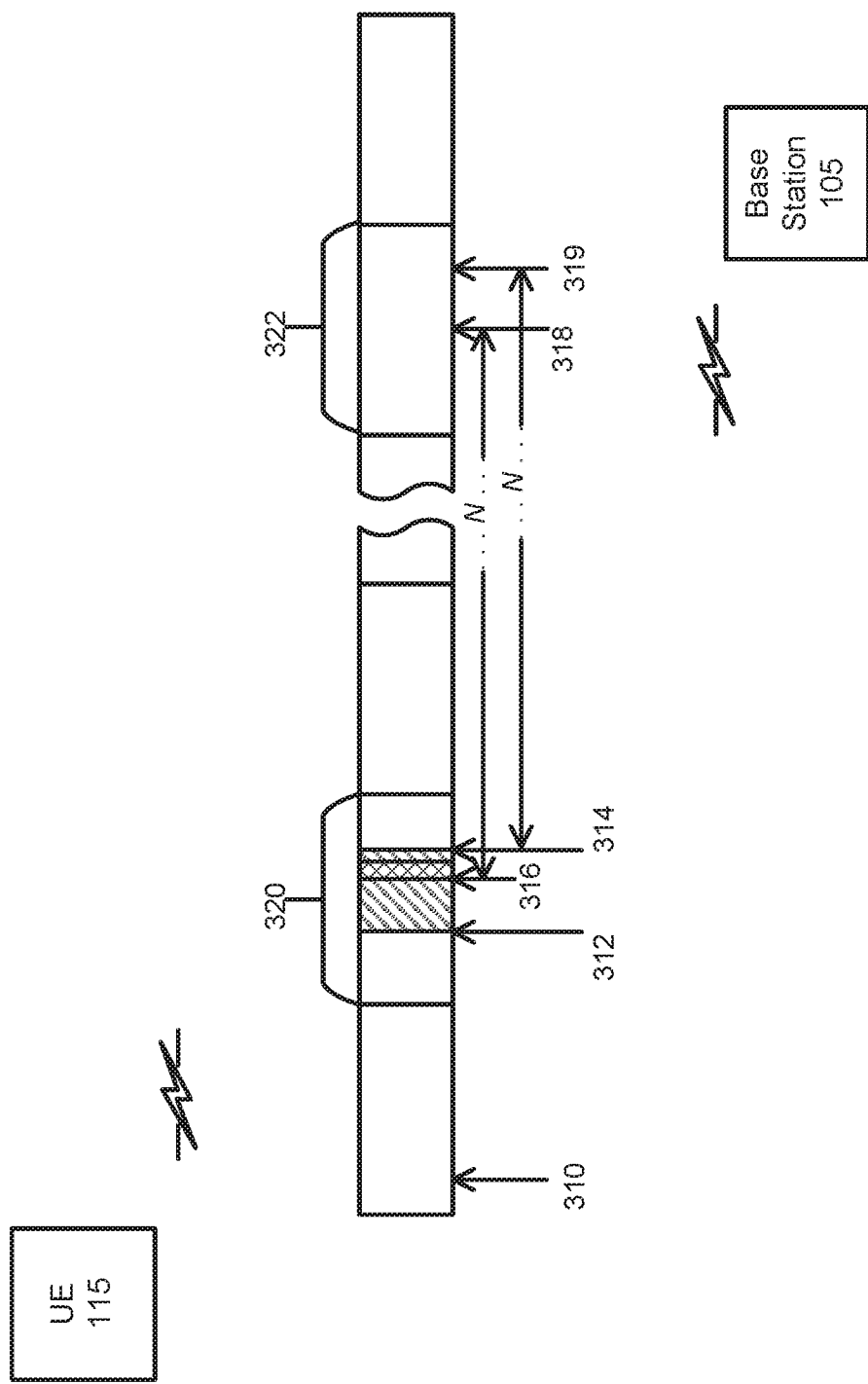
FIG. 3 is a block diagram illustrating a UE configured for ACK-based MAC-CE activation according to one aspect of the present disclosure.

FIG. 3 is a block diagram illustrating an ACK-based approach for MAC-CE activation in communication between a base station and UE configured according to aspects of the present disclosure. UE 115 may receive a downlink signal that includes a MAC-CE command from base station 105 at time 310. In response to receiving the MAC-CE command, UE 115 may transmit an ACK, beginning at time 312 to base station 105. The ACK transmission may comprise a number of symbols modulated with the ACK information, and may be scheduled to begin at time 312 and end at time 314. That is, the last ACK symbol may be scheduled to be transmitted at time 314. However, the ACK transmission may be interrupted at time 316. As discussed above, and as will be discussed in further detail below, the ACK transmission may be interrupted due to different reasons, such as preemption by higher priority traffic, a slot-form indicator (SFI) conflict, parallel PUCCH/PUSCH transmissions, etc. Due to the interruption, the ACK transmission may either be discontinuously transmitted, or may be dropped altogether. In each case, however, the ending ACK symbol may not be the symbol transmitted at time 314. For example, the last symbol actually transmitted, due to an interruption of the ACK transmission, may be the last ACK symbol transmitted before time 316. In a first approach in accordance with aspects of the present disclosure, the ending symbol may be determined to be the actual last symbol of the ACK transmission. Thus, in this first approach, the ending symbol may be advanced to the time of the interruption. As will be discussed in greater detail below, the MAC-CE command may be activated at time 318, which may be a time N slots from the last ACK symbol actually transmitted to base station 105 at time 316, or may be transmitted at the beginning of slot 322, which is a slot N slots after the end of slot 320, slot 320 being the slot carrying the ending ACK symbol transmitted to base station 105 at time 316.

In a second approach in accordance with aspects of the present disclosure, the condition associated with the ACK transmission may be disregarded, and the ending symbol may be determined to be the last symbol of the ACK transmission that would have been transmitted but for the condition. For example, after receiving the downlink signal carrying the MAC-CE command, UE 115 may transmit an ACK, beginning at time 312 to base station 105. The last ACK symbol may be scheduled to be transmitted at time 314. However, the ACK transmission may be interrupted at time 316. Due to the interruption, the ACK transmission may either be discontinuously transmitted, or may be dropped altogether. In this case, the last ACK symbol may not be the symbol transmitted at time 314. Nonetheless, under this approach, the interruption is disregarded, and the ending symbol is considered to be the symbol transmitted at symbol 314, regardless of the fact that it may not be the last ACK symbol. As such, under the second approach, the MAC-CE command may be activated after the latency period from time 314, even though the symbol transmitted at time 314 may not be the last ACK symbol. As will be discussed in more detail below, the MAC-CE command may be activated at time 319, which may be a time N slots from the ending ACK symbol at time 314, or may be transmitted at the beginning of slot 322, which is a slot N slots after the end of slot 320, slot 320 being the slot carrying the ending ACK symbol transmitted at time 314.

In a third approach in accordance with aspects of the present disclosure, the ACK transmission may be treated as a non-acknowledgment. A non-acknowledgement as used herein may refer to a negative acknowledgment (NACK) or may refer to the situation where an ACK is not received. For example, after receiving the downlink signal carrying the MAC-CE command, UE 115 may transmit an ACK, beginning at time 312 to base station 105. The last ACK symbol may be scheduled to be transmitted at time 314. However, the ACK transmission may be interrupted at time 316. Due to the interruption, the ACK transmission may either be discontinuously transmitted, or may be dropped altogether. In this case, UE 115 may determine that the ACK symbols actually transmitted may not be sufficient for base station 105 to successfully decode the ACK message. As such, base station 105 may treat the ACK message as a non-acknowledgement. In this scenario, the latency period may not be applied on the basis of the interrupted ACK transmission. In some implementations, UE 115 may subsequently retransmit the ACK message, and the MAC-CE command may be activated after the latency period from the ending period of the subsequent ACK.

In aspects of the present disclosure, which approach is used to determine a time for the activation of the MAC-CE may be determined based on different rules. For example, the approach used may be determined based on a specification. A rule may specify that the approach used may be a function of different parameters. These parameters may include a frequency band used, numerology, type of the MC-CE, a payload of the MAC-CE etc. Based on the specific parameters, a UE may determine which approach discussed above for determining when to activate the MAC-CE command is used. The type of MAC-CE command received may itself be one of the specific parameters. In some implementations, the first approach may be specified by the parameters, in which case the ending symbol of an ACK transmission, for purposes of MAC-CE activation, may be determined to be the actual last symbol of the ACK transmission. In alternative implementations, the parameters may specify using the second approach, and the ending symbol of an ACK transmission may be determined to be the last scheduled symbol of the ACK transmission that would have been transmitted but for the interruption. In yet other implementations, the parameters may specify using the third approach, and the UE may treat the ACK transmission as a non-acknowledgment when an interruption of the ACK transmission occurs, and may not activate the MAC-CE command N slots after the ending ACK symbol of the interrupted ACK transmission.

In some aspects, the approach used to determine a time to activate the MAC-CE may be indicated in a configuration message. The configuration message may include a message comprising control information, such as a master information block (MIB) message, a system information block (SIB) message, a radio resource control (RRC) message, the MAC-CE activation message, a downlink control information (DCI) message, etc. In some implementations, the configuration message may indicate specific capabilities of the UE. For example, a configuration message may indicate whether the UE supports URLLC. In the case where the UE transmitting the ACK does not support URLLC, the UE's transmission may not be punctured by URLLC traffic from the UE and thus, an approach for determining a time to activate the MAC-CE may be based on the UE's lack of support of URLLC traffic. However, in additional aspects, even though the UE may not be configured to support URLLC traffic, neighboring UEs may be configured to support URLLC traffic. In such aspects, there is a possibility that the UE's ACK transmission may be punctured by URLLC transmissions from the neighboring UEs. Thus, the rules for determining a time to activate the MAC-CE provided herein may be further based on the URLLC capabilities of neighboring UEs. In other aspects, the configuration message may indicate that the UE capabilities do not support preemption by higher-priority traffic. For example, the UE's ACK transmission may not be preempted even though there is higher-priority traffic (e.g., URLLC traffic) present. In this case, the UE may determine that the first approach may not be used, as the ACK transmission may not be interrupted by a preemption of higher-priority traffic.

Based on the configuration message, the UE may determine which approach discussed above for determining when to activate the MAC-CE command is used. In some implementations, the first approach may be used, in which case the ending symbol of an ACK transmission, for purposes of MAC-CE activation, may be determined to be the actual last symbol of the ACK transmission. In alternative implementations, the second approach may be used, and the ending symbol of an ACK transmission may be determined to be the last scheduled symbol of the ACK transmission that would have been transmitted but for the interruption. In yet other implementations, the third approach may be used, and the UE may treat the ACK transmission as a non-acknowledgment when an interruption of the ACK transmission occurs, and may not activate the MAC-CE command N slots after the ending ACK symbol of the interrupted ACK transmission.

In another aspect, the approach used to determine a time to activate the MAC-CE may be dependent on the cause of the interruption of the ACK transmission. For example, in one implementation, the ACK transmission may be interrupted by a higher-priority traffic preemption in order to free up resources for the higher-priority traffic. For example, higher-priority URLLC traffic preempts lower-priority eMBB traffic. Thus, it may be that, during the ACK transmission, URLLC traffic may be present, in which case the ACK transmission may be punctured in order to transmit the URLLC traffic. In this scenario, the ACK transmission may be discontinuously transmitted, with some of the punctured ACK symbols dropped, or the ACK symbols may be dropped entirely. Based on this type of interruption, due to preemption, the UE determines which approach to use for identifying a time to activate the MAC-CE. For example, the UE may use the first approach, and the ending symbol of an ACK transmission, for purposes of MAC-CE activation, may be determined to be the actual last symbol of the ACK transmission. In alternative implementations, the second approach may be used, and the ending symbol of an ACK transmission may be determined to be the last scheduled symbol of the ACK transmission that would have been transmitted but for the interruption. In yet other implementations, the third approach may be used, and the UE may treat the ACK transmission as a non-acknowledgment when an interruption of the ACK transmission occurs, and may not activate the MAC-CE command N slots after the ending ACK symbol of the interrupted ACK transmission.

In another example of a specific cause of the interruption of the ACK transmission, the ACK interruption may be caused by a SFI conflict. The ACK transmission on the uplink may include a flexible OFDM symbol. The flexible OFDM symbol may be used for either uplink or downlink. In some cases, the flexible OFDM symbol in the ACK transmission may be updated as to downlink an indication in the SFI received in a downlink control information (DCI). This update of the flexible OFDM symbol to downlink may create a conflict, as the flexible OFDM symbol may already be scheduled to be used by the uplink ACK transmission. In some aspects, the SFI conflict may delay the ACK transmission to the next slot. However, in other aspects, the SFI conflict may result in a discontinuous transmission of the ACK in the slot with the SFI conflict, as at least one of the ACK transmission symbols is dropped due to the SFI conflict. In accordance with the present disclosure, the UE may take into account the SFI conflict in determining the time to activate the MAC-CE. For example, the UE may use the first approach, in which case the ending symbol of an ACK transmission, for purposes of MAC-CE activation, may be determined to be the actual last symbol of the ACK transmission. In alternative implementations, the second approach may be used, and the ending symbol of an ACK transmission may be determined to be the last scheduled symbol of the ACK transmission that would have been transmitted but for the interruption. In yet other implementations, the third approach may be used, and the UE may treat the ACK transmission as a non-acknowledgment when an interruption of the ACK transmission occurs, and may not activate the MAC-CE command N slots after the ending ACK symbol of the interrupted ACK transmission.

In another example of a specific cause of the interruption of the ACK transmission, the ACK interruption may be caused by rules governing the avoidance of parallel transmissions of PUCCH and PUSCH. Transmission of both PUCCH and PUSCH may be allowed in the same slot. However, the transmission of the PUCCH and PUSCH in the same slot may not be allowed to occur at the same time, as this may create intermodulation distortion among other issues. In some implementations, the ACK transmission may be schedule for the PUCCH. However, the rules for avoiding parallel transmissions of PUCCH and PUSCH may cause the ACK transmission to be shifted to the PUSCH. The shifting of the ACK transmission to the PUSCH may cause the ACK message to be multiplexed with other UCI to be transmitted on the PUSCH. As discussed herein, the multiplexed transmission creates an ambiguity with respect to the timing for activation of the MAC-CE command.

In other aspects of the present disclosure, the rules for avoiding parallel transmissions of PUCCH and PUSCH may cause the ACK transmission to be dropped completely. In these case, the third approach may be used, and the UE may treat the dropped ACK transmission as a non-acknowledgment. Thus, in these aspects, the MAC-CE command may not be activated N slots after the ending ACK symbol of the interrupted ACK transmission. In yet other aspects present disclosure, the rules for avoiding parallel transmissions of PUCCH and PUSCH may cause the ACK transmission to be partially dropped. In this instance, the approach used may be any of the approaches discussed above, and may include the first, second, or third approach.

Figure 4:
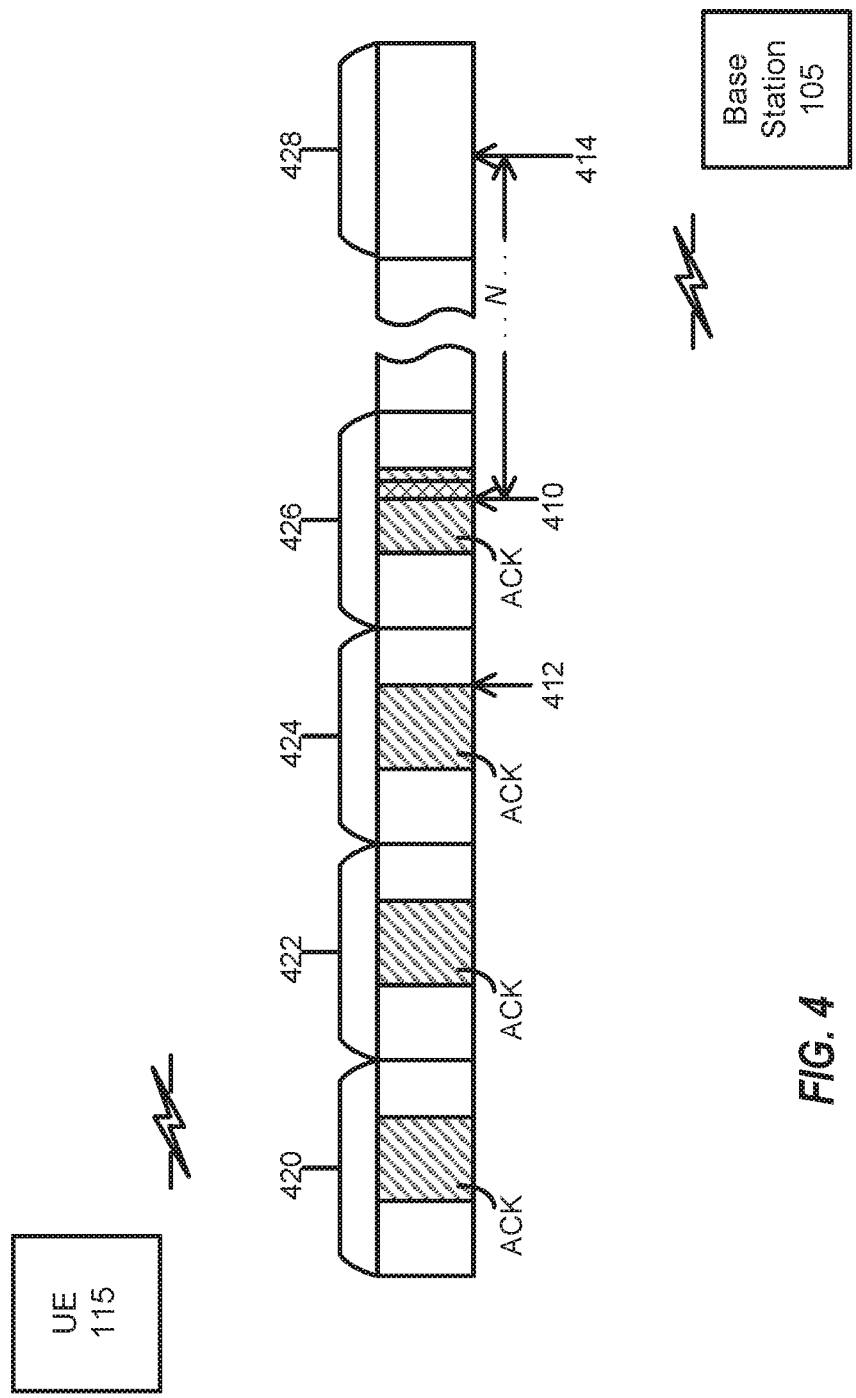
FIG. 4 is a block diagram illustrating a UE configured for multi-slot ACK-based MAC-CE activation according to one aspect of the present disclosure.

FIG. 4 is a block diagram illustrating a multi-slot ACK-based approach for MAC-CE activation in communication between a base station and UE configured according to aspects of the present disclosure. UE 115 may determine to transmit, to base station 105, an ACK for a MAC-CE command message in the multi-slot ACK shown in FIG. 4. The multi-slot ACK may be scheduled to be transmitted in slots 420, 422, 424, and 426. In a first example, the transmission of ACK symbols 410 of the ACK symbols in slot 426 may be interrupted for any of the reasons discussed in this disclosure. For example, ACK symbols 410 may be preempted or punctured by higher-priority traffic, such as ACK data for eMBB traffic being preempted by URLLC uplink data or control signals. In aspects, the approach used to determine a time to activate the MAC-CE may depend on whether the interruption of the ACK transmission causes a partial discontinuous transmission of the ACK within a slot, or whether the interruption of the ACK transmission is caused by a discontinuous transmission of entire slots in a multi-slot ACK transmission. For example, UE 115 may determine a time to activate the MAC-CE based on the partial intra-slot interruption of the multi-slot ACK. In another example, slots 420, 422, and 424 may be transmitted to base station 105, but slot 426 may not be transmitted. In this example, UE 115 may determine a time to activate the MAC-CE based on the whole-slot discontinuous transmission of the multi-slot ACK.

It should be noted that, in some aspects, the latency for activating the MAC-CE command may be calculated from the ending ACK symbol to the start of a specified symbol. For example, the activation of the MAC-CE command may occur at the start of the symbol N slots after the ending ACK symbol. In these aspects, partial interruptions of the ACK transmission within a slot may affect the activation time of the MAC-CE, as the ending symbol within the slot may be different depending on the interruption, which may affect the calculation of the time to activate the MAC-CE, as described in this disclosure. Similarly, interruptions in the transmission of an entire slot in multi-slot ACK may affect the activation time of the MAC-CE command. For example, with reference back to FIG. 3, activation of the MAC-CE command may occur at the start of the symbol N slots after the ending ACK symbol. In this example, the ACK transmission at time 312 may be interrupted at time 316. In accordance with aspects of the present disclosure, the ending ACK symbol may be determined to be the symbol transmitted at time 316. In this case, the MAC-CE command may be activated at the start of the symbol at time 318, which may be N slots after time 316. In another example, the ending ACK symbol may be determined to be the symbol transmitted at time 314. The MAC-CE command may be activated at the start of the symbol at time 319, which may be N slots after time 314. In yet another example, with reference to FIG. 4, a multi-slot transmission may be scheduled to be transmitted in slots 420, 422, 424, and 426. In this example, slots 420, 422, and 424 may be transmitted to base station 105, but slot 426 may not be transmitted. Thus, the ending ACK symbol may be determined to be the symbol transmitted at time 412 of slot 424. In this case, the MAC-CE command may be activated at the start of the symbol at time 414 of slot 428, which may be N slots after time 412.

In other aspects, the latency for activating the MAC-CE command may be calculated from the ending ACK symbol to the start of a specified slot. For example, the activation of the MAC-CE command may occur at the start of the slot N slots after the slot carrying the ending ACK symbol. In these aspects, partial interruptions of the ACK transmission within a slot may not affect the activation time of the MAC-CE, as the time within the slot where the ending symbol is does not affect the calculation because the latency is measured from the end of the slot. However, interruptions in the transmission of an entire slot in multi-slot ACK may affect the activation time of the MAC-CE command. For example, with reference back to FIG. 3, activation of the MAC-CE command may occur at the start of the slot N slots after the slot carrying the ending ACK symbol. In this example, the ACK transmission at time 312 may be interrupted at time 316. In accordance with aspects of the present disclosure, the ending ACK symbol may be determined to be the symbol transmitted at time 316 or may be determined to be the symbol transmitted at time 314. In either case, the MAC-CE command may be activated at the start of slot 322, which may be N slots after slot 320, which is the slot carrying both the symbol transmitted at time 316 and the symbol transmitted at time 314. In another example, with reference to FIG. 4, a multi-slot transmission may be scheduled to be transmitted in slots 420, 422, 424, and 426. In this example, slots 420, 422, and 424 may be transmitted to base station 105, but slot 426 may not be transmitted. Thus, the ending ACK symbol may be determined to be the symbol transmitted at time 412 of slot 424. In this case, the MAC-CE command may be activated at the start of slot 428, which may be N slots after slot 424.

In some aspects, the approach used to determine a time to activate the MAC-CE may depend on the degree and/or severity of the ACK transmission interruption. For example, in some implementations, an ACK transmission from a UE to a base station may be interrupted and the entire ACK transmission may be dropped. In this case, the ACK message may not be transmitted to the base station. The UE may determine to use the third approach, and may treat the interrupted ACK transmission as a non-acknowledgment. In other aspects, the severity of the ACK transmission may be such that, even though the entire ACK transmission may not be dropped, sufficient ACK symbols are interrupted that the UE determines the base station will not be capable of decoding the ACK message. In this case, the UE may determine to use the third approach, and may treat the interrupted ACK transmission as a non-acknowledgment.

In some aspects, whether the ACK transmission is severe enough to determine that the base station will not be able to decode the ACK message may be based on a severity threshold. Thus, when the severity threshold is exceeded, the UE may determine to use the third approach. In some aspects, the severity threshold may be based on a code rate, or may be based on a predetermined value, which may be provided in a specification or configuration message. In additional aspects, the severity threshold may be based on a PUCCH format and parameters. For example, the severity threshold may be based on whether hopping is enabled or disabled. The ACK transmission may or may not be interrupted when transmitted between hops. In this example, when the ACK transmission is not interrupted in at least one hop, that is, at least one hop of the ACK transmission is intact, the ACK transmission may be considered as transmitted, and the UE may determine a time to activate the MAC-CE in accordance with the various aspects disclosed herein. However, when there is no hop of the ACK transmission intact, that is, when every hop is interrupted, the ACK transmission may be considered as a non-acknowledgement, and the UE may determine to use the third approach of aspects disclosed herein.

Figure 5:
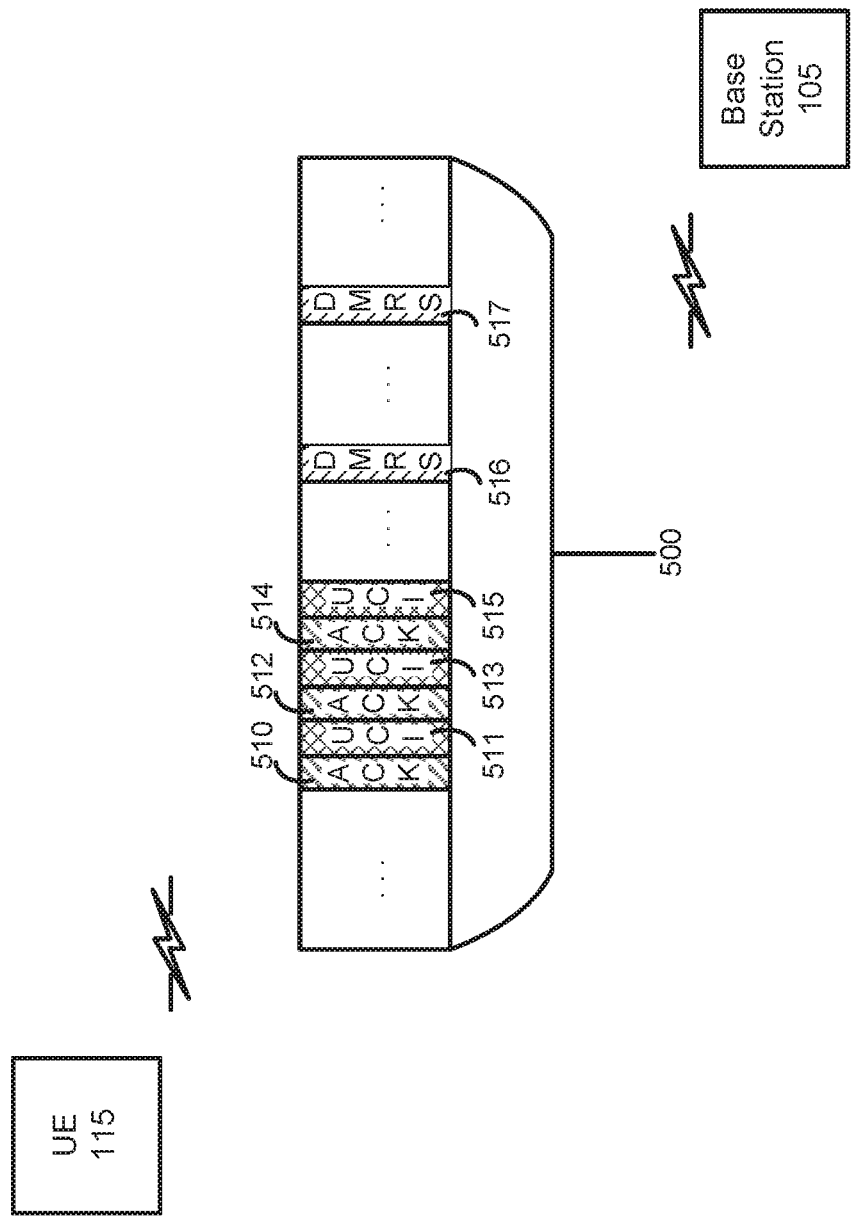
FIG. 5 is a block diagram illustrating a UE configured for multiplexed ACK-based MAC-CE activation according to one aspect of the present disclosure.

FIG. 5 is a block diagram illustrating a multiplexed ACK transmission approach for MAC-CE activation in communication between a base station and UE configured according to aspects of the present disclosure. FIG. 5 shows an ACK transmission over PUCCH or PUSCH, where the ACK transmission is multiplexed with other UCI. As shown in FIG. 5, ACK symbols may be multiplexed with UCI symbols in multiplexed PUSCH/PUCCH transmission 500. Symbols 510, 512, and 514 may be modulated with ACK, while symbols 511, 513, and 515 may be modulated with other UCI. As noted above, the current approach fails to provide a mechanism for determining a time for activating a MAC-CE command based on the multiplexed PUSCH/PUCCH transmission 500. In accordance with aspects of the present disclosure, a first option may be used to handle multiplexed PUSCH/PUCCH transmission 500. In this option, UE 115 may consider the entire multiplexed PUSCH/PUCCH transmission 500 as the ACK transmission. Thus, UE 115 may determine the time to activate the MAC-CE command, in accordance with the different approaches disclosed herein, based on the entire multiplexed PUSCH/PUCCH transmission 500. In this case, the ending ACK symbol may be a symbol that is not actually modulated with ACK. For example, multiplexed PUSCH/PUCCH transmission 500 may be interrupted at symbol 513, such that the last symbol transmitted may be the UCI symbols at 513. UE 115 may determine to use the first approach, and may activate the MAC-CE command N slots after symbol 513, even though symbol 513 is not an ACK symbol. In another example, UE 115 may determine to use the second approach, and may activate the MAC-CE command N slots after the end of multiplexed PUSCH/PUCCH transmission 500, regardless of which symbols in multiplexed PUSCH/PUCCH transmission 500 are modulated with ACK, and regardless of the interruption occurring at symbol 513. In yet another example, UE 115 may determine to use the third approach and may determine to treat the entire multiplexed PUSCH/PUCCH transmission 500 as a non-acknowledgement, regardless of whether the ACK symbols may have been transmitted.

As shown in FIG. 5, the last symbol modulated with ACK may occur earlier than the last symbol of multiplexed PUSCH/PUCCH transmission 500. For example, the last symbol modulated with ACK occurs at 514, which is earlier than the end of multiplexed PUSCH/PUCCH transmission 500. However, there may be symbols after the last ACK symbol that may be needed in order to successfully demodulate the ACK symbols. For example, symbols 516, and 517 may be demodulation reference signal (DMRS) that may be needed by base station 105 to demodulate the ACK symbols and decode the ACK message. It is noted that not all subsequent symbols may be needed. For example, UCI symbol 515 may not be needed to demodulate the ACK symbols. In accordance with aspects of the present disclosure, a second option may be used to handle multiplexed PUSCH/PUCCH transmission 500. In this option, UE 115 may determine if there are symbols needed to demodulate the ACK symbols, such as DMRS symbols, and if there are no DMRS symbols, UE 115 may determine a time for activating a MAC-CE command based on the last ACK symbol. However, if UE 115 determines that there are symbols in the multiplexed transmissions needed to demodulate the ACK symbols, such as DMRS symbols, UE 115 may determine to apply the first option discussed above, and may determine the time to activate the MAC-CE command, in accordance with the different approaches disclosed herein, based on the entire multiplexed PUSCH/PUCCH transmission 500. Alternative, when there are DMRS symbols in the multiplexed transmissions, UE 115 may determine to use the last DMRS in the multiplexed transmission in determining a time to activate the MAC-CE command. For example, UE 115 may determine to use DMRS symbol 517 to determine the time to activate the MAC-CE command. In some aspects, there may be multiple DMRS symbols in the multiplexed transmissions. In this case, UE 115 may determine to use the first DMRS symbol after the last ACK symbol in determining a time to activate the MAC-CE command. For example, UE 115 may determine to use DMRS symbol 516 to determine the time to activate the MAC-CE command.

It should be noted that, in the case of multiplexed PUSCH/PUCCH transmission, the above options may be combined with the approaches discussed above in order to address situations when the multiplexed PUSCH/PUCCH transmission is interrupted. For example, the first option above may be used, and the entire multiplexed PUSCH/PUCCH transmission may be considered as the ACK transmission. This may be combined with the third approach, and the entire multiplexed PUSCH/PUCCH transmission may be considered as dropped if any part of the multiplexed PUSCH/PUCCH transmission is dropped. Alternatively, the second option above may be used, and the whole multiplexed PUSCH/PUCCH transmission may be treated as interrupted if any part of the multiplexed PUSCH/PUCCH transmission carrying ACK or DMRS is interrupted. In this case, symbols carrying information other than ACK or DMRS are disregarded.

Figure 6:
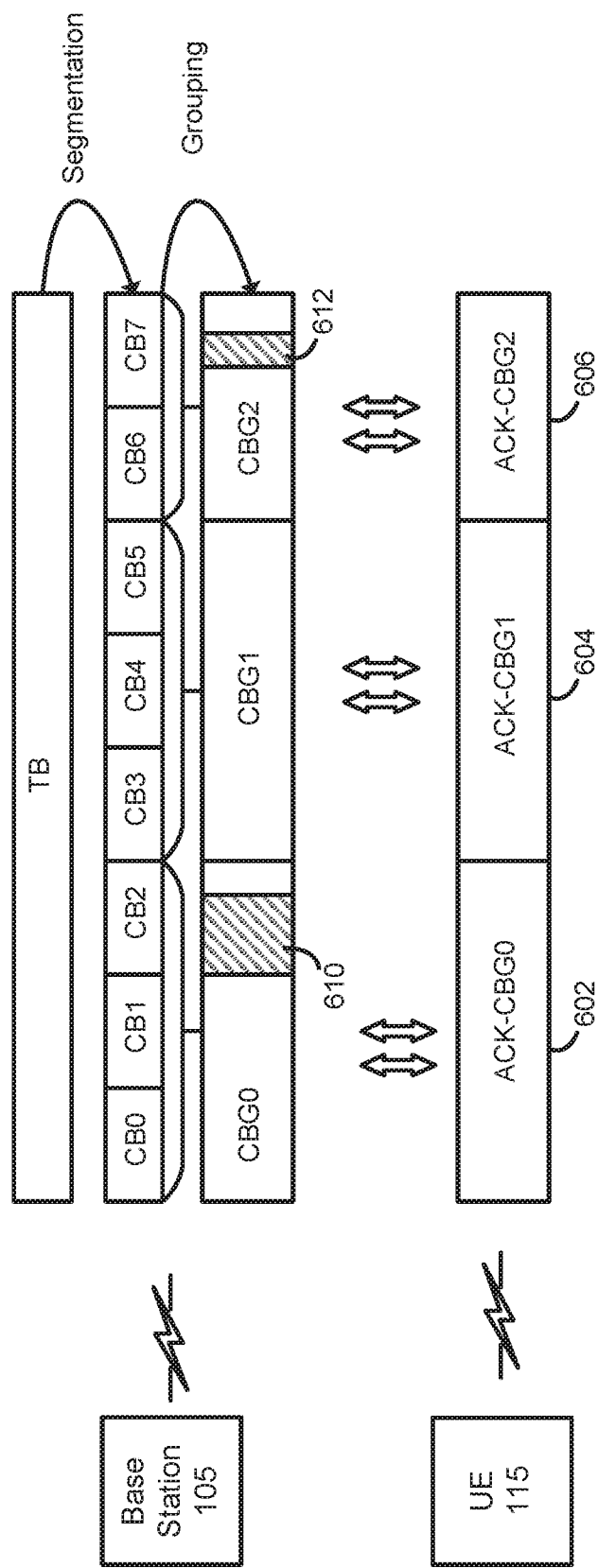
FIG. 6 is a block diagram illustrating a UE and base station configured for CBG ACK-based MAC-CE activation according to one aspect of the present disclosure.

FIG. 6 is a block diagram illustrating a CBG-based ACK approach for MAC-CE activation in communication between a base station and UE configured according to aspects of the present disclosure. As noted above, the MAC-CE message may be received by UE 115 in at least one CBG of a set of CBGs. A transport block may be segmented into code blocks, and the code blocks may be grouped into the set of CBGs. The MAC-CE may be transmitted in at least one of the CBGs in the set. For example, a MAC-CE command may be transmitted from base station 105 to UE 115 at 610 of CBG0 and at 612 of CBG 2. UE 115 may receive the set of CBGs and may be able to reconstruct the MAC-CE message from the CBGs. UE 115 may transmit an acknowledgment for each of the CBGs. For example, UE 115 may transmit ACKs 602, 604, and 607 for CBG0, CBG1, and CBG2, respectively. As noted above, the current approach fails to provide a mechanism for determining a time for activation of the MAC-CE message based on the CBG-based ACK.

In aspects of the present disclosure, a CBG-based ACK may be considered complete once an acknowledgement for those CBGs carrying MAC-CE information is sent. For example, the CBG-based ACK illustrated in FIG. 6 may be considered transmitted when ACK messages 602 and 606 are transmitted, even though ACK message 604 may not be transmitted. In another aspect, a CBG-based ACK may be considered complete once an acknowledgement for all CBGs is sent, regardless of which CBGs carry MAC-CE information. For example, the CBG-based ACK illustrated in FIG. 6 may be considered transmitted when all ACK messages 602, 604, and 606 are transmitted, even though CBG1 corresponding to ACK message 604 did not carry MAC-CE information. In some aspects, whether the CBG-based ACK may be considered complete once an acknowledgement for those CBGs carrying MAC-CE information is sent or once an acknowledgement for all CBGs is sent, regardless of which CBGs carry MAC-CE information may be determined based on a configuration message, and/or UE capabilities.

As such, the approaches and options discussed above may be applied to CBG-based ACK, considering the CBG-based ACK as the ACK transmission. Thus, when a particular ACK message is interrupted, the CBG-based ACK may be considered interrupted and the above techniques may be applied to determine when to activate the MAC-CE.

As noted above, a UE may successfully transmit the ACK message without interruption. However, the base station may retransmit the downlink signal carrying the MAC-CE command, indicating that the UE's ACK was not decoded successfully by the base station. The UE may transmit a second ACK acknowledging the downlink signal retransmission. However, as also noted above, the current approach may fail to effectively handle this situation, as the current implementations do not provide for activating the MAC-CE command based on the second ACK. In accordance with aspects of the present disclosure, a UE may determine a time to activate the MAC-CE command based on the ending symbol of the first ACK message. The ending symbol may be determined in accordance with aspects of the present disclosure. As such, the MAC-CE may be activated N slots after the ending symbol of the first ACK transmission. In other aspects, the UE may determine a time to activate the MAC-CE command based on the ending symbol of the second ACK message. As such, the MAC-CE may be activated N slots after the ending symbol of the second ACK transmission. This approach may provide the benefit of synchronizing the UE and the base station with respect to the MAC-CE activation time, as the base station may not be able to determine the ending symbol of the first ACK message, since the base station was unable to decode the first ACK message. Furthermore, this approach for determining a time to activate the MAC-CE command based on a retransmission of the ACK message may also be applicable to the CBG-based ACK, and may be considered in the situation when the base station retransmits a CBG that has already been acknowledged.

Figure 7:
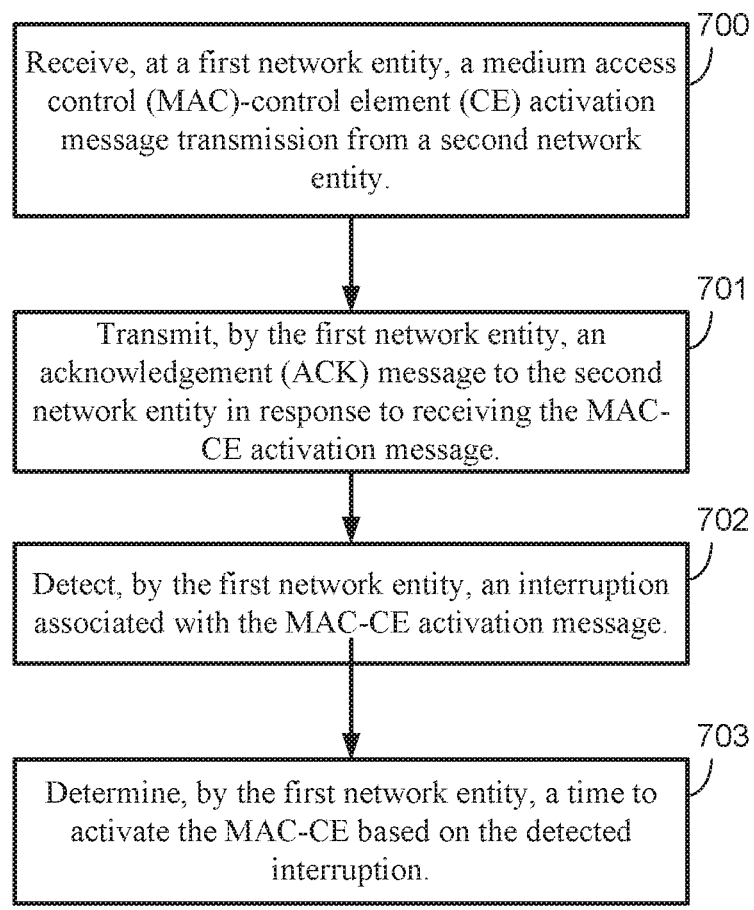
FIG. 7 is a block diagram illustrating example blocks executed to implement one aspect of the present disclosure
Figure 8:
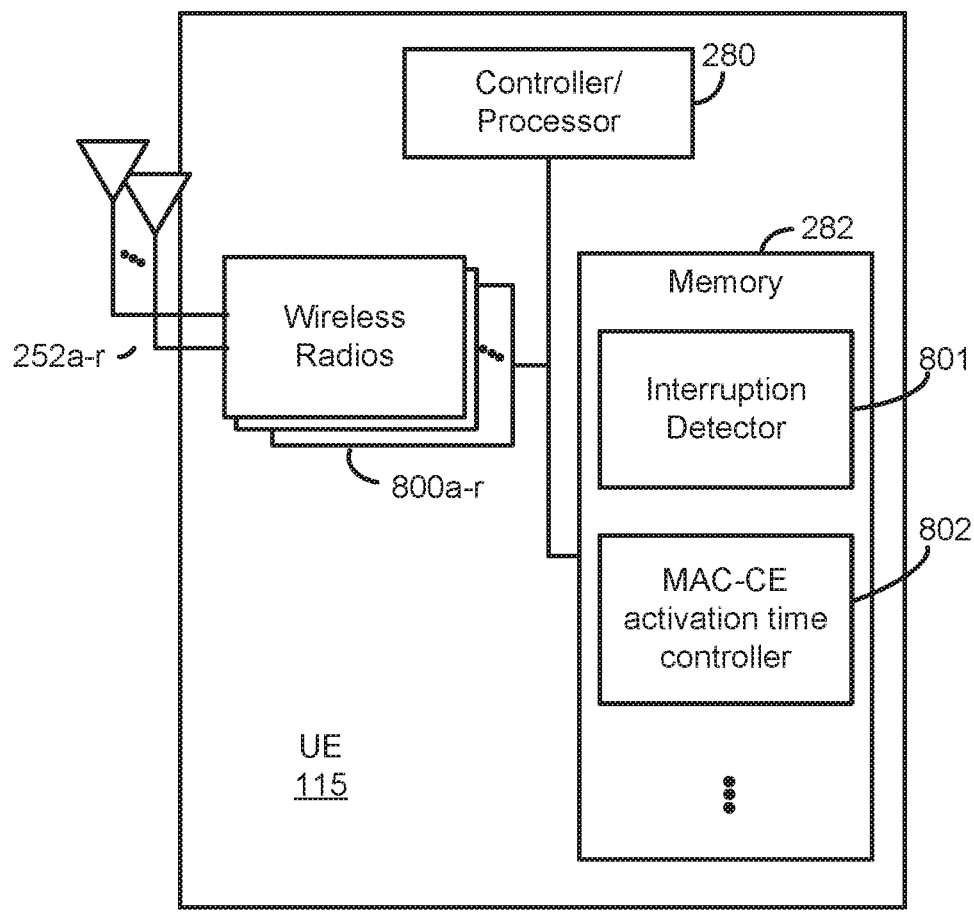
FIG. 8 is a block diagram illustrating a UE configured according to one aspect of the present disclosure.

FIG. 7 is a functional block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 700, a first network entity receives MAC-CE activation message transmission from a second network entity. The first network entity, such as UE 115, may receive the MAC-CE activation message via antennas 252a-r and wireless radios 800a-r from a second network entity, such as base station 105. The MAC-CE activation message may be received in a downlink control channel, such as PDSCH and the like. In some aspects, the MAC-CE activation message may be received in at least one CBG, and the UE may reconstruct the MAC-CE activation message from the at least one CBG.

At block 701, the first network entity transmits an ACK message to the second network entity in response to receiving the MAC-CE activation message. The first network entity, such as UE 115, may transmit the ACK message to the second network entity, such as base station 105, via antennas 252a-r and wireless radios 800a-r. The ACK message may be transmitted in an uplink channel, such as the PUCCH or PUSCH. In some aspects, the ACK message may be multiplexed with other UCI in the uplink channel. In yet other aspects, the ACK message may be a CBG-based ACK transmission.

At block 702, the first network entity detects an interruption associated with the MAC-CE activation message. The first network entity, such as UE 115, under control of controller/processor 280, executes interruption detector 801, stored in memory 282. The execution environment of interruption detector 801 allows for UE 115 to detect an interruption associated with the MAC-CE activation message. In aspects, the interruption associated with the MAC-CE activation message may include an interruption of the ACK transmission, an interruption of the reception of the MAC-CE message at the first network entity, or an interruption of the transmission of the MAC-CE message from the second network entity. In other aspects, the interruption associated with the MAC-CE activation message may include the ACK message being multiplexed with other UCI into a multiplexed transmission. In yet other aspects, the interruption associated with the MAC-CE activation message may include the ACK transmission including a CBG-based ACK message.

At block 702, the UE determines a time to activate the MAC CE based on the detected interruption. The UE, such as UE 115, under control of controller/processor 280, executes MAC-CE activation time controller 802, stored in memory 282. The execution environment of MAC-CE activation time controller 802 allows for UE 115 to determine a time to activate the MAC CE based on the detected interruption. In aspects, the determination of the time to activate the MAC-CE may include determining to activate the MAC-CE at a predetermined number of symbols after a last symbol that was transmitted/received prior to the interruption. In other aspects, the determination of the time to activate the MAC-CE may include determining to activate the MAC-CE at the predetermined number of symbols after a last scheduled symbol of the transmission/reception. In these aspects, the last scheduled symbol may be the last symbol of the transmission/reception that would have been transmitted/received but for the interruption. In yet other aspects, the determination of the time to activate the MAC-CE may include deeming the interrupted transmission/reception as a non-acknowledgment and determining to activate the MAC CE at the predetermined number of symbols after a subsequent ACK transmission by the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3-8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a first network entity, in at least two code block groups (CBGs) of a transport block, segments of a medium access control (MAC)-control element (CE) activation message transmission from a second network entity, wherein the first network entity is configured to reconstruct the received segments to generate the MAC-CE activation message at the first network entity;
   transmitting, by the first network entity, multiple acknowledgement (ACK) messages to the second network entity in response to receiving the MAC-CE activation message, wherein the transmitting the multiple ACK messages to the second network includes transmitting an ACK for each CBG in the at least two CBGs carrying MAC-CE segments; and
   determining, by the first network entity, a time to activate a MAC-CE based on the transmitted multiple ACK messages.

2. The method of claim 1, wherein the determining the time to activate the MAC-CE is based on the transmitting the ACK for the each CBG carrying the MAC-CE segments.

3. The method of claim 1, wherein the transmitting the multiple ACK messages to the second network entity includes transmitting the ACK for all CBGs, including the CBGs that do not carry MAC-CE segments, in the transport block, and wherein the determining the time to activate the MAC-CE is based on the transmitting the ACK for all CBGs in the transport block.

4. The method of claim 1, further comprising:
   receiving, at the first network entity, second segments of MAC-CE activation message subsequent to the transmitting the multiple ACK messages, wherein the receiving the second segments of MAC-CE activation message indicates that the second network entity was unable to decode the multiple ACK messages; and transmitting, by the first network entity, second multiple ACK messages to the second network entity in response to receiving the second segments of MAC-CE activation message, wherein the determining the time to activate the MAC-CE at is further based on the transmitting the second multiple ACK messages.

5. The method of claim 1, wherein the first network entity is a user equipment (UE) and the second network entity is a base station, or wherein the first network entity is a base station and the second network entity is a UE.

6. An apparatus configured for wireless communication, the apparatus comprising:

at least one processor; and a memory coupled to the at least one processor, wherein the at least one processor is configured to:

receive, at a first network entity, in at least two code block groups (CBGs) of a transport block, segments of medium access control (MAC)-control element (CE) activation message transmission from a second network entity, wherein the first network entity is configured to reconstruct the received segments to generate the MAC-CE activation message at the first network entity;

transmit, by the first network entity, multiple acknowledgement (ACK) messages to the second network entity in response to receiving the MAC-CE activation message, wherein the at least one processor configured to transmit an ACK for each CBG in the at least two CBGs carrying MAC-CE segments; and determining, by the first network entity, a time to activate a MAC-CE based on the transmitted multiple ACK messages.

7. The apparatus of claim 6, wherein the at least one processor is configured to determine the time to activate the MAC-CE based on transmitting the ACK for the each CBG carrying the MAC-CE segments.

8. The apparatus of claim 6, wherein the at least one processor is configured to transmit the ACK for all CBGs, including the CBGs that do not carry MAC-CE segments, in the transport block, and wherein the at least one processor is configured to determine the time to activate the MAC-CE based on transmitting the ACK for all CBGs in the transport block.

9. The apparatus of claim 6, wherein the at least one processor is further configured to:

receive, at the first network entity, second segments of MAC-CE activation message subsequent to the transmitting the multiple ACK messages, wherein the receiving the second segments of MAC-CE activation message indicates that the second network entity was unable to decode the multiple ACK messages; and transmit, by the first network entity, second multiple ACK messages to the second network entity in response to receiving the second segments of MAC-CE activation message, wherein the determining is further based on the transmitting the second multiple ACK messages.

10. The apparatus of claim 6, wherein the first network entity is a user equipment (UE) and the second network entity is a base station, or wherein the first network entity is a base station and the second network entity is a UE.

11. The method of claim 1, wherein the segments of the MAC-CE activation message are consecutively positioned in different CBGs of the transport block.

12. The method of claim 1, wherein the segments of the MAC-CE activation message are non-consecutively positioned in different CBGs of the transport block.

13. The method of claim 1, wherein the determining the time to activate the MAC-CE is further based on at least one of:

parameters specifying at least one of: a frequency band, numerology, a type of the MAC-CE, and a payload of the MAC-CE;

a configuration message including one of: a master information block (MIB) message, a system information block (SIB) message, a radio resource control (RRC) message, the MAC-CE activation message, and a downlink control information (DCI) message; and capabilities of the first network entity, the capabilities including whether the first network entity supports ultra-reliable low latency communication (URLLC).

14. The apparatus of claim 6, wherein the segments of the MAC-CE activation message are consecutively positioned in different CBGs of the transport block.

15. The apparatus of claim 6, wherein the segments of the MAC-CE activation message are non-consecutively positioned in different CBGs of the transport block.

16. The apparatus of claim 6, wherein the at least one processor is configured to determine the time to activate the MAC-CE further based on at least one of:

parameters specifying at least one of: a frequency band, numerology, a type of the MAC-CE, and a payload of the MAC-CE;

a configuration message including one of: a master information block (MIB) message, a system information block (SIB) message, a radio resource control (RRC) message, the MAC-CE activation message, and a downlink control information (DCI) message; and capabilities of the first network entity, the capabilities including whether the first network entity supports ultra-reliable low latency communication (URLLC).

* * * * *